United States Patent [19]

Pollard

[11] 4,173,492
[45] Nov. 6, 1979

[54] METHOD OF PREPARING COATED PIGMENT PARTICLES AND THE PRODUCT PRODUCED THEREBY

[76] Inventor: Edward T. Pollard, 78 Jefferson, Huron, Ohio 44839

[21] Appl. No.: 888,946

[22] Filed: Mar. 22, 1978

Related U.S. Application Data

[63] Continuation of Ser. No. 668,724, Mar. 19, 1976, abandoned.

[51] Int. Cl.$^2$ ............................................. C09C 3/08
[52] U.S. Cl. ........................... 106/308 F; 106/308 Q; 252/316
[58] Field of Search ............... 252/316; 106/308 F, 106/308 Q; 428/403; 427/221, 374 C; 366/71, 144

[56] References Cited

U.S. PATENT DOCUMENTS

| | | | |
|---|---|---|---|
| 3,546,150 | 12/1970 | White et al. | 106/308 F |
| 3,728,143 | 4/1973 | Pollard | 106/308 N |
| 3,773,535 | 11/1973 | Burgyan et al. | 106/308 Q |

OTHER PUBLICATIONS

Perry, R. H., et al., *Chemical Engineers' Handbook,* McGraw-Hill Book Co., New York, 1973, pp. 19-17 to 19-18.
*The Condensed Chemical Dictionary* (van Nostrand Reinhold Company, New York), 1971, pp. 176-177, "castorwax".

*Primary Examiner*—Benjamin R. Padgett
*Assistant Examiner*—Deborah L. Kyle
*Attorney, Agent, or Firm*—Meyer, Tilberry & Body

[57] ABSTRACT

A method of preparing coated pigment particles for dry compounding with a polymeric material such as plastic or rubber, which method comprises the steps of providing particles of a hydrophilic color pigment, mixing the pigment particles with a wax having a given melting point temperature and a brittle condition below a given lower temperature, heating the mixture above a process temperature substantially above the melting temperature and substantially above the boiling point of water to boil away entrapped water, subjecting the mixture to high shear mixing while at the process temperature, cooling the mixture to a temperature below the given lower temperature to produce a solid mass, and, then, breaking the solid mass into flakes.

7 Claims, 2 Drawing Figures

METHOD OF PREPARING COATED PIGMENT PARTICLES AND THE PRODUCT PRODUCED THEREBY

This is a continuation of application Ser. No. 668,724 filed Mar. 19, 1976, now abandoned.

The present invention relates to the art of producing coated pigment particles and more particularly to an improved method of preparing coated pigment particles for use in a polymeric plastic or rubber material.

The invention is particularly applicable for producing pigment particles to be used with a thermoplastic material for adding color to the material and it will be described with particular reference thereto; however, it is appreciated that the invention has much broader applications and may be used for producing pigments to be used in various polymeric plastic and rubber materials, such as thermosetting plastics, synthetic rubber and thermoplastics.

To produce color in a plastic material, it is somewhat general practice to provide a color concentrate which is mixed with the resin and then molded in a low shear type of equipment to produce the colored plastic material for subsequent forming. This product which adds color to the plastic material is hydrophilic and has a tendency to entrap and absorb moisture. Thus, during subsequent molding of the plastic material the moisture can cause irregularities and detract from the color hue of the resulting plastic article. Thus, there is a tremendous amount of effort being devoted to a vehicle for coloring plastic material which will not entrap moisture and will produce a better dispersion of the colorant or color pigment throughout the plastic to be molded. One suggestion has been to coat the particles of color pigment with melted fatty acid amide. This is suggested in U.S. Pat. No. 3,728,143. This process uses particles coated with a fatty acid amide which particles are then dispersed throughout the plastic material. This prior concept has not proven as successful as originally anticipated, since the process requires low shear mixing which detracts from the dispersion of pigment. In addition, this prior process did not extract trapped moisture which is generally present in the range of about 50% with pigment in the standard presscake form. The mixing was accomplished in a closed vessel, such as an extruder, which entrained a certain amount of moisture within the resulting composition. The low-shear mixing of the pigment and fatty acid amide did not assure expulsion of entrapped moisture. The cost of equipment for producing the resulting coated particles was quite high and required substantial processing volumes before such equipment could be economically justified. The wax material was expensive and was not compatible with rubber. In addition, high shear equipment was required in the mixing step. The present invention relates to an improved method and composition to produce pigment particles coated with a wax which method and composition overcomes the disadvantages of the fatty acid amide wax concept and produces a product having a moisture content of less than about 3%–4% by weight, even when the pigment originally includes upwards of 50% by weight of water.

PRIOR ART

British Pat. No. 576,100 discloses a process for producing a protective coating on dyestuff powders by mixing powders with not more than 10% liquefied oily or waxy substances, like paraffin. This process is used to produce a compressed pellet and results in low concentration of coated product.

U.S. Pat. No. 1,813,371 discloses a process for preparing a composite pigment with finely divided substrates and aqueous media whereby the precipitated particles carry with them a wax material coating. This is a solution precipitation process and is used for typewriter ribbons, carbon paper and other such items.

U.S. Pat. No. 2,772,982 relates to a process for dispersing pigment in a solid organic wax in the presence of a liquid grinding media of water. The water and organic solvent are present throughout the milling operation and hinder the attempt to extract water from the hydrophilic pigment particles.

U.S. Pat. No. 3,353,974 relates to the preparation of a master batch pigment composition wherein organic and inorganic pigment and a non-resinous matrix is obtained from a non-volatile hydrocarbon oil and organic wax. This material is extruded so as to create homogeneous dispersion.

U.S. Pat. No. 3,252,820 relates to the production of paint using a pigment extender with a thixotropic wax powder.

U.S. Pat. No. 3,728,143, which was discussed previously, relates to coating of pigment particles by a fatty acid amide. This arrangement employs low shear mixing which does not positively drive moisture from the hydrophilic pigments nor produce a dispersion of the pigments as fine as that produced by the present invention.

U.S. Pat. No. 3,778,288 teaches the preparation of an agglomerated additive by mixing a high melting point wax binder and pigments in the high speed mixing operation. Agitation is required for forming pigment agglomerates. This arrangement uses very low temperatures which would not drive the entrapped moisture from the hydrophilic pigment particles.

BACKGROUND OF INVENTION

The above disclosed patents demonstrate that there are distinct advantages in coating pigments to produce a less dusty and better dispersed pigment product. The ideal colorant of this type must meet certain standards. The pigment particles must be non-dusting to comply with OSHA standards. The pigment must be highly dispersed so as to obtain the highest possible color strength of the resulting product. In addition, it is necessary to utilize an FDA-approved additive so that the resulting plastic color particle can be used in the plastic food container industry. It is desirable to obtain a high concentration of pigment particles in the matrix to produce the desired color at the lowest possible cost. Further, it is necessary to utilize equipment requiring the lowest possible energy and the highest possible combination of the desired results discussed above. The present invention relates to a method and composition made by this method which meet the above standards better than any product now known and/or used.

In accordance with the present invention, there is provided a method of preparing coated pigment particles for dry compounding with a polymeric plastic or rubber material, which method comprises the steps of providing particles of hydrophilic color pigment, mixing the pigment particles with a wax having a given melting point temperature and a brittle condition below a given lower temperature, heating the mixture above a process temperature substantially above the melting temperature and substantially above about 212° F. to vaporize entrapped water, subjecting the mixture to high shear mixing while at or above the process temperature, cooling the mixture to a temperature below the given lower temperature to produce a solid mass, and, then, breaking the solid mass into flakes.

In accordance with another aspect of the present invention, there is provided a composition in the form of flakes, each of which includes color pigment particles each encapsulated in wax and the flakes having a water content of less than about 3%–4% by weight.

By using the above-defined invention, the resulting composition approaches an ideal colorant for use in polymeric plastic and rubber material. It is known that pigment agglomerations and aggregations are often produced in the form of pigment "presscakes". Presscakes are then dried to remove moisture and produce a relatively dry powder product. This dry product is then mixed with thermoplastic material and worked in an extruder. Thereafter, the extruded combination presscake and plastic material is chopped into pellets to form a commercial plastic stock. This is a hydrophilic type of material used as a colorant and incorporates the high moisture presscake. The presscake powder is mixed with the thermoplastic material to produce the colored plastic pellets. The extent of a dispersion of the presscake powder in the thermoplastic material is normally controlled by the amount of working done by the extruder used to extrude the plastic mass to break up the pigment agglomerates formed during the drying of the presscake. This prior system for producing a plastic colorant entraps water because of its hydrophilic nature and does not produce a finely dispersed pigment for subsequent coloring of plastic articles.

In the present invention, it is preferred to use presscake pigment before it has been dried. As is known, drying causes agglomerations due to the close natural bonding between the pigment after water is driven therefrom. Of course, dried pigment can also be used in accordance with the present invention. In the present invention, a high shear milling is employed as will be described in more detail. The special wax matrix contemplated by the present invention replaces the water binder of presscake particles with a wax binder to produce wax coated pigment particles. During the processing of the pigments, the normal water entrapped in the presscake particles is driven off by processing the mixture in an open milling container which allows rapid removal of water vapor from the pigment particles. The present invention reduces the amount of total energy consumed in the oven drying step which is normally used in drying presscake to remove its water content. In the present invention, the water content is removed simultaneously with the mixing operation. This saves a substantial amount of energy and creates a far superior end product. The direct replacement of water with a wax binder before the presscake pigment can agglomerate is a new concept in using presscake pigment. During the simultaneous driving off of water and incorporation of the special wax, which in practice is a hydroxystearate wax, pigments are protected against subsequent absorption of water. Thus, they are converted into a hydrophobic colorant having a long shelf life and which does not create striations and other defects in subsequently formed plastic due to retained or absorbed moisture. Thus, by using the combined water extraction and wax coating process, a substantial amount of energy is saved which is both economically and environmentally advantageous.

Another advantage of the present system is that the resulting colorant having a water content of less than about 3%–4% is extremely beneficial because of the reduction in water content, the hydrophobic nature of the compound, and the extremely fine dispersion of the pigments within the colorant to produce an increased hue in the resulting plastic article. In accordance with the present invention, a three roll mill having two heated feed rolls and an adjacent cooling roll are used. The present method can be performed by a single, commercially available piece of equipment with minor modifications. The machine contemplated by the present invention to perform the method set forth above produces a one step mechanical method for producing the finished chip or flakes of colorant which have the attributes of high pigment concentration, high color hue, and low moisture affinity. The resulting chip or flakes produced by the apparatus are non-dusting in that they do not break into dust particles which would cause difficulty in meeting the OSHA regulations for industrial manufacturing plants. The present invention produces a high dispersion characteristic due to the high shear mixing obtained in the milling machine contemplated by the present invention. The concept of making color concentrate or colorant in a single step using non-agglomerated presscake has not been used in the art of producing colorants from pigments. As previously mentioned, the term "presscake" relates to pigment particles which are formed in a manner to produce the pigment which is finely divided. This pigment has a high water content of approximately 50% and agglomeration can occur if this pigment is dried preparatory to use in a process for making a colorant from the pigment. In the past, if presscake were dried, it had to be subsequently milled to again produce unagglomerated pigment for subsequent processing. This required a substantial amount of energy and processing time not necessary in the present invention which can accept and process presscake pigment without prior drying. In this manner, presscake pigment remains non-agglomerated so that there can be a direct replacement of the moisture with wax during the mixing and heating process contemplated in the present invention. The wax matrix binders contemplated by the present invention are FDA approved for contact with food. In this manner, the resulting plastic material can be formed into plastic containers for use in the food process industry which is an important feature in any colorant for plastic material. If the colorant does not have FDA approval or is formed from material not having FDA approval, this is a serious economic and practical drawback to the colorant. The present invention also contemplates the use of FDA approved "FD & C pigments". These color pigments are produced and are commercially available in presscake or other form containing generally 5–30% water. This type of FDA-approved pigment can be used in the present invention without dehydration and the resulting composition or colorant has a final water content of less than 3% by weight. Thus, the resulting product is acceptable to the FDA and has a low moisture content which is necessary to produce uniform, high-luster colors in plastic and rubber materials. The high pigment loading obtained by the present invention is in excess of approximately 75–90% by weight which is apparently obtainable because of the use of the milling process which allows a thorough heating of the special resin, thus the wax prevents aggregation of the pigment particles which is one cause of streaking and poor coloring of plastic resin using previously known colorants. The pigmented plastic resin or rubber composition is produced by mixing the colorant produced in accordance with the method described above with the normal plastic resin or rubber to produce a brilliant colored end composition which is made possible because of the ability of the wax-coated pigment to be wetted by the plastic resin or rubber during mixing with the new colorant. The high pigment loading is made possible by using a colorant produced in accordance with the present invention.

In accordance with the invention, a hydroxystearate wax is used as the coating agent. The preferred hydroxystearate wax is glyceryl-tris-12-hydroxystearate: $C_3H_5-(OOCC_{17}H_{34}OH)_3$. Other examples of hydroxystearate waxes are methyl hydroxystearate, propylene glycol mono-hydroxystearate, glyceryl mono-hydroxystearate, ethylene glycol mono-hydroxystearate and stearyl-12-hydroxystearate. Glyceryl-tris-12-hydroxystearate is a hard, brittle wax-like solid with a melting point temperature of 86° C.–88° C. (about 188° F.). The listed hydroxystearate waxes have melting point temperatures in the range of 52° C.–88° C. which is substantially below the normal boiling point temperature of water. These hydroxystearate waxes are insoluble at room temperature in most organic solvents, but are highly compatible with plastic resins and waxes. These waxes have sharp melting points and minimum shrinkage and are usable in food packaging. This material assists in mold release when compounded with a plastic resin and adds in blending of some plastic materials. These waxes are saturated ricinoleate esters which have medium range melting wax-like solids that exhibit oxidation stability and oil and water resistance.

The term pigment means substances which are generally considered insoluble in the vehicle, and pigments generally have the property of light refractivity. (Dyes are considered soluble and generally have only the property of light absorption.) Phosphorescent, luminescent, fluorescent, metalescent, and pearlescent materials fit within the term pigment, as used herein and in the art. The pigment must be in particle form and should have a mean particle size between about 0.1 and about 100 microns and preferably between about 0.2 and about 50 microns. The most preferred mean particle size for organic pigments is about 0.2 micron. The most preferred particle size for inorganic pigments is about 50 microns.

Examples of organic and inorganic pigments which can be used in this invention are iron blue, zinc oxide, titanium dioxide, chrome yellow, carbon black, chrome orange, chrome green, zinc chromate, red lead, lethol red, the lakes, azo type toners, phthalocyanines, aluminum hydrates, lakes, iron oxide, white lead, extenders, phosphotungstic acid toners, titanium-containing pigments, sulfur-containing pigments, extenders, calcium carbonate, aluminum oxide, lithopane, ultraphone, lead chromate, cadmium sulfide, cadmium selenide, barium sulfate, azo pigments, anthraquinone and vat pigments, phthalocyanine pigments, acrylamino yellow, magnesium oxide, chrome red, antimony oxide, zinc sulfide, magnesium fluoride and ground barytes. Benzoid pigments are useful and examples are toners and lakes. Examples of benzoid toners are yellow toners, e.g., benzoid yellows and Hansa yellows; orange toners, e.g. vat orange 3; red toners, e.g., napthol reds; violet toners; blue toners; green toners; brown toners; and black toners. Examples of bezoid lakes are yellow lakes, e.g., acid yellow 2; orange lakes; red lakes; violet lakes; blue lakes; e.g. acid blue 93; green lakes; brown lakes; and black lakes, e.g., natural black 3. Metallic pigments can be used, and examples are aluminum flakes. Mixtures of pigments can be used.

In the present invention, the pigment particles may be presscake particles. These are produced in a non-agglomerated condition by a process which results in 30%–50% combined water. By using the present invention, the presscake particles are simultaneously dehydrated and coated with a hydroxystearate wax. The equipment used is open to the atmosphere which allows for nearly complete extraction of entrapped moisture which would be generally impossible in closed equipment such as extruders or batch mixers. High shear forces applied to the mixture also assist in positive expulsion of entrapped moisture. In prior systems, the standard presscake form of pigments required an oven drying step to expell moisture. This required additional energy and caused agglomeration of pigment particles. Consequently, the agglomerated particles had to be ground which was difficult and required special equipment. If the dried particles were not immediately processed, they again absorbed moisture. For these reasons, moisture content of prior colorants often was at least 10% by weight. The present invention uses the hydrated, non-agglomerated pigment particles without prior drying or other processing. Of course, dried and/or ground pigment particles can be used in the present invention with the advantage that absorbed moisture is positively expelled during the process without special equipment or high energy requirements.

Any thermoplastic material can be formulated with the coated pigments of this invention. Examples of thermoplastics with which the pigment dispersions can be used are: the ABS resins prepared from acrylonitrile, butadiene and styrene; blends of ABS resins with other thermoplastics, such as, polyvinylchloride; resins prepared from acrylonitrile, butadiene, styrene and alpha methyl styrene; resins prepared from butadiene, styrene and methacrylic acid; resins prepared from acrylonitrile, butadiene, styrene and methyl methacrylate acetal copolymers; acetal resins; acrylic resins and modified acrylic resins, such as, polymethyl methacrylate, copolymers of styrene and methyl methacrylate, copolymers of methyl methacrylate and alpha methyl styrene; the cellulosic plastics, such as, cellulose acetate plastics, cellulose acetate butyrate plastics, cellulose propionate plastics, ethyl cellulose plastics and cellulose nitrate plastics; mixtures of ethyl cellulose plastics and cellulose acetate butyrate; chorinated polyether; the fluoroplastics; such as, polytetrafluoroethylene, polyvinylidene fluoride, the fluorinated ethylene-propylene plastics and the chlorotrifluoroethylene plastics; the phenoxy resins; the polybutadiene-type resins, such as, butadiene-styrene copolymer and polybutadiene; the polycarbonates; the polyethylene resins, such as, low-density polyethylene; copolymers of polyethylene with other materials; chlorinated polyethylenes; chlorosulfonated polyethylenes; ethylene vinyl acetate copolymer; ethylene acrylate copolymer; polyphenylene oxide; the polypropylenes; the polysulfones; the polystyrenes; styrene copolymers, such as, styrene-methyl methacrylate copolymer; and vinyl polymers and copolymers, such as, polyvinyl chloride, copolymer of vinyl chloride and vinyl acetate, copolymer of vinyl chloride, wax and pigment to drive off the water and immediately replace the water with wax within a high shear mixing arrangement which enhances the amount of pigment that can be loaded into a selected amount of wax. In the present invention, an open milling arrangement is used instead of a confined fixed tank or closed type of mixing unit which hinders the extraction of liquid and produces a low shear type of mixing which reduces the amount of pigment loading. Used in the present invention, presscake pigment which has a low dusting factor can be directly introduced into the processing machinery. This prevents loss of pigment from the dusting phenomenon. The resulting pigment does not form into individual particles until it is mixed in the heating and high shear mixer which liquefies the special wax matrix, replaces the water driven off and encapsulates the individual color pigment particles before they can escape into the atmosphere. Thus, the wax binds the product into the mixer until a wax-pigment saturation mixture is obtained. This mixture is then passed over a cooling roll which chills the mixture to a brittle state on the roll ifself. The solid mixture is then chipped from the roll to produce snowflake-like chips or flakes which is the resultant commerical product to which the present invention is directed. It can be seen that a very simple, inexpensive, low energy consuming apparatus can be used for producing colorant flakes with high pigment dispersion and low moisture content and affinity. This concept has not been used or contemplated in the art of making colorants for plastic or rubber material prior to the development of the present invention.

The object of the present invention is to satisfy the criteria set forth in the above section. As somewhat of a summary, one of the primary objects of the present invention is the provision of a method of preparing coated pigment particles for dry compounding with plastic or rubber material, which method produces a colorant having a low moisture content.

Another object of the present invention is the provision of a method as defined above which can be performed on inexpensive equipment using relatively small amounts of energy.

A still further object of the present invention is the provision of a method as defined above, which method produces a colorant having a high concentration of pigment in a wax matrix.

Still a further object of the present invention is the provision of a method as defined above, which method produces a colorant having a high concentration of pigment, evenly dispersed in a wax matrix.

Yet another object of the present invention is the provision of a method as defined above, which method produces a colorant that has a low affinity for moisture, a long shelf life and uses a wax substantially less expensive than a fatty acid amine wax.

Still a further object of the invention is the provision of a method as defined above, which method uses high shear in mixing pigment particles with a hydroxystearate wax.

Another object of the present invention is the provision of a new plastic colorant, which colorant includes flakes of pigment and hydroxystearate wax with a moisture content of less than about 3%-4% by weight, a high pigment concentration in the wax matrix and a fine, even dispersion of the pigment within the matrix.

These and other objects and advantages will become apparent from the description of the present invention which is configured hereinafter.

BRIEF DESCRIPTION OF DRAWINGS

In the present application, the following drawings are utilized.

FURTHER DESCRIPTION OF THE INVENTION

Figure 1:
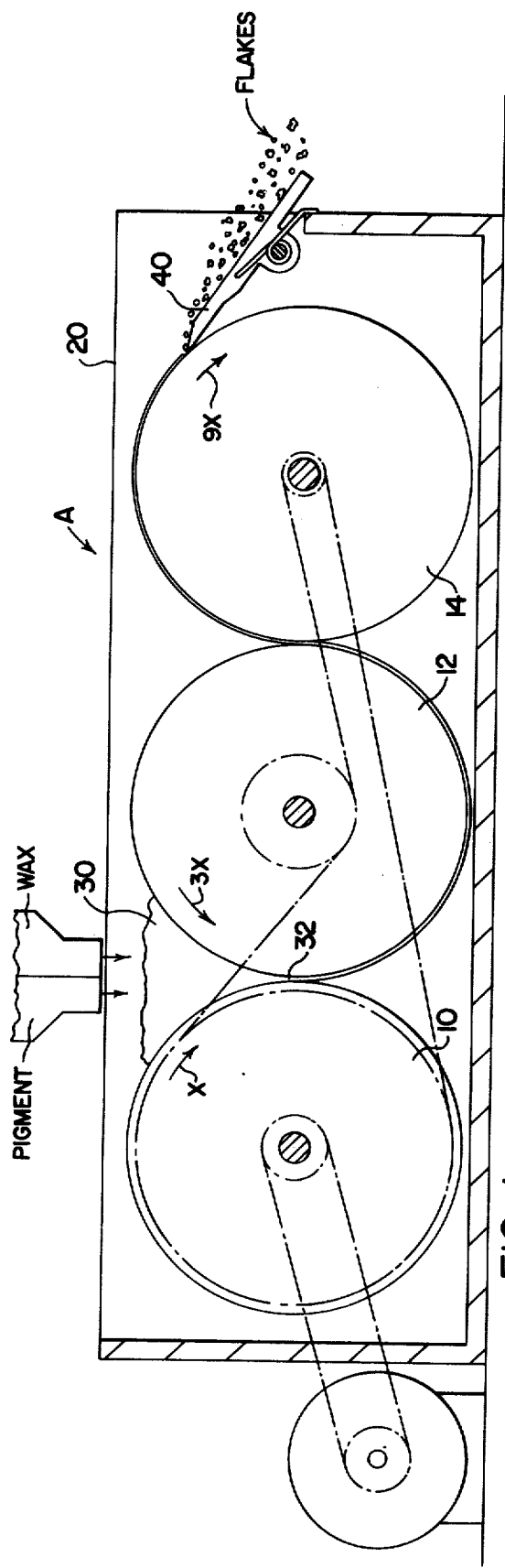
FIG. 1 is a schematic drawing indicating the equipment used in performing the method of the present invention; and, FIG. 2 is a partial enlarged view illustrating operating characteristics of the equipment shown in FIG. 1.

Certain aspects of the present invention have been described in the introductory portion of this specification; however, a more detailed description of the invention will be provided with respect to the showings of the drawings which are for the purpose of illustrating a preferred embodiment and not for purposes of limiting the invention. In accordance with the preferred embodiment of the invention, the hydroxystearate wax is used to coat color pigments which are in particle form. The hydroxystearate wax encapsulates the particles to produce a flake which includes encapsulated pigment particles and coating wax. The pigments are well dispersed throughout the wax and the resulting product is a flake or chip that is substantially larger than individual pigment particles. This product or colorant is formulated with a plastic resin or synthetic rubber to produce a high dispersion of pigment within the resin for subsequent use. High dispersion in the resin is obtained by the high dispersion of pigment within the wax matrix, which dispersion is obtained by heating particles of hydroxystearate wax and pigment before they agglomerate and mixing the particles while the wax melts. During this heating operation, which is substantially above the boiling point of water, any moisture within the pigment particles, which can be in the range of 30%-50% in the case of presscake particles, is driven off at the same time that the wax is melted and coated onto the surfaces of the pigment. In this manner, there is a simultaneous expulsion of moisture and coating of dehydrated pigment particles by the wax. During this mixing and heating procedure, the mixture is ultimately subjected to a high shear caused by passing the mixture between two adjacent rolls rotating at different speeds. This high shear assists in expelling unwanted moisture and increasing the dispersion of the pigment within the wax matrix. The wax has a high wetting coefficient with respect to the pigment so that there is an even and fine dispersion of the pigment particles within the melted wax matrix as the mixture is passing between the two differential rolls. Thereafter, the hydroxystearate wax which surrounds and encapsulates the individual particles of pigment is cooled and solidifies into its normal brittle state. In this manner, the individual pigment particles cannot agglomerate or form into high color pockets which can cause color variations in the resulting product. The cooling is accomplished, in accordance with the preferred embodiment of the invention, by passing the mixture over a cooled roll. When passing over the roll, the solidified wax can be chipped or scrapped from the roll in flakes or irregular particles for use as a colorant in a plastic resin or rubber. Either thermoplastic or thermosetting plastic can be used.

The present invention also relates to the end product which is the plastic material, resin or rubber mixed with the colorant construction in accordance with the invention as described above. This resulting composition has a high dispersion of pigment throughout the plastic vinyl acetate and vinyl alcohol, copolymer of vinyl chloride and vinylidene chloride, and polyvinyldichloride.

Reinforced thermoplastics can be used. The reinforcing is normally done with glass fibers, fibrous asbestos, metal fibers, refractory fibers, and other fibers.

Various fillers can be used in the thermoplastics compositions. Examples of the fillers are calcium carbonate, carbon black, clay, asbestos, mica, talc, barium sulfate, magnesium oxide, barium carbonate, ground glass, and metal powders. It is noted that several of the fillers are also listed as useful pigments. A material can be used as a pigment and a filler, but when it is used as a pigment it must have been treated with a hydroxystearate wax.

The thermoplastic compositions can contain other conventional materials, such as, plasticizers, stabilizers, flame retardants, UV absorbers, antistatic additives, etc.

The coated pigment can contain from about 10 to about 90 percent by weight of pigment and from about 90 to about 10 percent by weight of hydroxystearate wax, although the preferred amount of pigment is 30 to 75 percent by weight and the preferred amount of wax is 70 to 25 percent by weight. Between about 0.1 and about 10 parts by weight of the coated pigment can be formulated 100 parts by weight of the thermoplastic, although the preferred amount of coated pigment is 0.5 to 3.0 parts by weight per 100 parts by weight of the thermoplastic.

The coated pigments include an individual pigment encased in the vehicle or several individual pigments encased in the vehicle, but there is no agglomeration of the pigments in the vehicle. The wax solidifies around the encapsulated pigment particles. There is development of essentially the full color potential of the pigments. This is achieved through the superior wetting action of the hydroxystearate vehicle. Also, extremely high pigment loadings are possible with the coated pigments, for example, 100 parts of coated pigment to one part of resin.

The coated pigment is dustless, which is extremely important in a commerical sense. The coated pigment are not drawn together by standing or due to vibration, the latter is very important when automated coloring systems are used.

The coated pigment particles (after being sized) are formulated and formed with uncolored thermoplastic material particles in or by some low-shear compounding means, such as, an injection molder, rotational casting means, blow molding machinery, extruder, Banbury-type mechanical mixer and compounding rolls. (High shear compounding means can be used, but is not necessary or preferred.) The final product can have any shape, such as, film, sheet, rod, filament, cubical, spherical, etc. The final product can even be formed. Thus the dry coloring of formed thermoplastic materials is achieved without the use of high shear as is necessary in the prior art methods and with prior art pigments.

Figure 2:
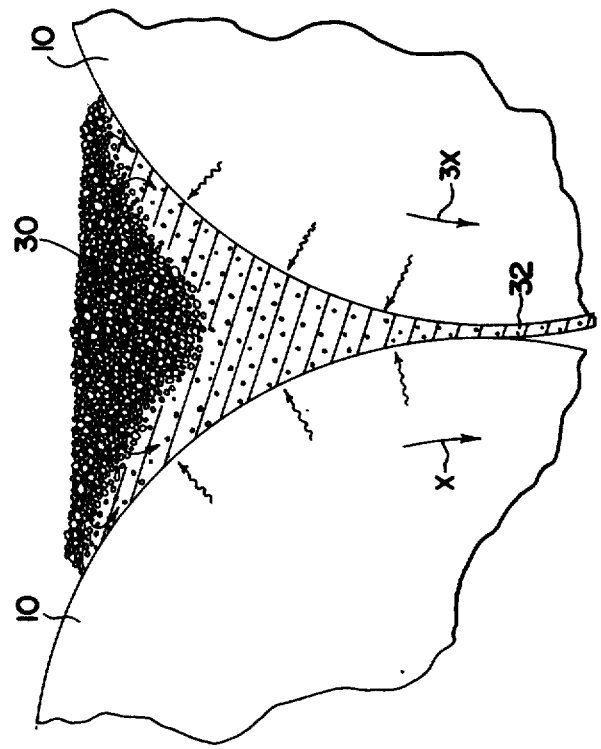

Referring now to the Figures, FIG. 1 shows an apparatus A used in producing the desired colorant flakes from pigment particles which may have upwards of 50% by weight of entrapped moisture. This apparatus is a somewhat standard three roll mill having horizontally aligned, adjacent rolls 10, 12, 14. In accordance with the invention, rolls 10, 12 are used for initial heating and mixing of the pigment particles and hydroxystearate particles. To produce high shear and desired mixing, the rolls 10, 12 are rotated at a different speed. The faster roll 12 is operated at a speed of 3 X which is three times the speed X of roll 10. In practice, the rolls are chromium plated steel having a diameter of 10 inches and a length of 30 inches and the speed X is 50 RPM. The outlet or exit roll 14 is driven at a speed of 9 X which is three times the speed of roll 12. These rolls are situated in an open receptacle 20 which closes the opposite ends of the rolls 10, 12 and 14 to cause the material to travel in the path illustrated in FIG. 1. In the area 30 which is above the nip between rolls 10, 12 the pigment particles and wax particles are heated and mixed. In practice, rolls 10, 12 are heated to a temperature in the range of 250° F.–450° F. Preferably, the rolls are approximately 400° F. This produces a rapid heating of the particle mixture in the area 30 which causes a rapid expulsion of moisture from the pigment particles and a simultaneous coating of the particles by melting of the wax within the area 30. This produces a turning and kneading action of the particles. The melted wax, in a somewhat lower shear type of mixing action, is preparatory to the mixture of molten wax and pigment particles in high shear at the nip area 32 between rolls 10, 12. In this nip area, the mixture is subjected to a high shear mechanical action which assists in the final moisture expulsion from the pigment particles. This high shear action causes a fine, even dispersion of pigment particles within the heated wax matrix. The general mixing and compressing action between rolls 10, 12 is schematically illustrated in FIG. 2. The pigment and molten wax mixture clings to the high speed roll in accordance with normal practice and passes around the roll 12 to the nip between roll 12 and roll 14. This produces an additional high shear mixing action. When contacting roll 14, which is cooled to a temperature of a general range of minus 10° F. to 100° F., the wax matrix solidifies into a solid mass which is carried over roll 14 to an exit scraper or chipper 40, which chips the material from roll 14 into discrete flakes of coated pigment particles. The nip spacing between rolls 10 and 12 is in the general range of approximately 0.005–0.010 inches. Thus, the flexible mixture on roll 12 is generally in the range of 0.005–0.10 inches in thickness. This pigment is retained on roll 14 so that a very fine solidified layer appears on roll 14 at the chipper 40. This thin layer is rapidly cooled to the temperature of roll 14 prior to reaching the chipper. Thus, since the hydroxystearate wax is brittle and hard at approximately room temperature, the chipper produces fractured flakes of colorant which may include several wax-encapsulated pigment particles. The apparatus A with heated and cooled rolls is an available ink mill and is somewhat inexpensive. It is noted that prior drying and grinding of the pigment particles is not required. In addition, complicated and expensive extruders and mixing devices are not necessary. In using the apparatus, the high shear mixing and heating of the material is effected conveniently and quite rapidly. The wax particles and pigment particles are loaded into the area above nip 32 in bulk in proportion to that desired in the final product. Modifications could be made in the apparatus without departing from the apparatus aspect of the present invention as long as the operating characteristics schematically illustrated in FIGS. 1 and 2 are utilized.

EXAMPLE 1

1000 g of Cadmium orange presscake pigment was admixed with 500 g of glyceryl-tris-12-hydroxystearate. The resulting mixture was placed in a three roll mill as shown in FIG. 1 in which the front two rolls 10, 12 were heated to 250°–450° F., and the take-off roll 14 was cooled to obtain the desired final colorant flakes. A dough-like mixture forms on the heated rolls 10, 12 which attains a temperature of more than 212° F. thereby driving off the water and moisture and replacing the same with a hydrophobic wax matrix. The resulting paste-like mixture passes through the front two hot dispersing rolls 10, 12 to the cooling roll 14. Because of the pressure and temperature variations on the rolls, there is provided a continuous sheet which is fractured into a snowflake-like product. The small "chip-like", product or colorant can be employed as a plastic product colorant. Analysis of the resulting product shows a high pigment dispersion due to the high shear attained by the three roll mill A, as well as the excellent wetting properties of the hydroxystearate waxes. The residual moisture is normally less than 5% by weight and generally less than 3%–4%.

EXAMPLE 2

500 g of FD&C yellow #5 (containing up to 20% moisture) is admixed with 500 g of glyceryl-tris-12-hydroxystearate. The resulting mixture is treated using the aforementioned three roll mill. The resulting powdery, "nondusting" colorant or product was found to contain less than 3% moisture. By their nature, FD&C colorants normally would hygroscopically pick up about 10% moisture. However, the product produced in accordance with the invention was analyzed after one week open exposure to the atmosphere. The surprisingly low moisture absorption is contrary to any FD&C pigment colorant or product known heretofore.

EXAMPLE 3

900 g of 50% pigment scarlet presscake was admixed with 400 g of glyceryl-tris-12-hydroxystearate. The resulting mixture was treated as in Example 1, resulting in a colorant which was evaluated and found to be free of pigment agglomerates normally found in poorly dispersed organic pigment concentrates. The product was easily dispersed in a polyester thermoplastic resin by normal molding techniques.

EXAMPLE 4

800 g of 50% Anthroquinone presscake was admixed with 400 g of methyl hydroxystearate. The resulting mixture was treated as in Example 1, resulting in a granular chip dispersion, which had uniquely high color development and solubility characteristics making it suitable as a paste colorant replacement in styrene-containing polyester resin systems.

Having thus defined the invention, it is claimed:

1. A method of preparing colorant flakes comprised of hydrophilic color pigment particles embedded in a wax matrix for dry compounding with a polymeric material, said method comprising the steps of:
   (a) providing particles of said color pigment dispersed in a presscake having a given moisture content, said particles having a size ranging from about 0.1 micron to about 100 microns;
   (b) before dehydration of said presscake, mixing said particles with particles of a hydroxystearate wax which has a melting point temperature and is brittle below a selected lower temperature substantially below 212° F. while simultaneously heating the formed admixture to a processing temperature substantially above 212° F., by discharging said pigment particles and wax particles into the nip region of a pair of rotating rolls heated to said processing temperature, to simultaneously boil away any entrapped moisture in said pigment particles and melt the said wax to encapsulate the said pigment particles and form said particle admixture into a molten wax-pigment particle mixture;
   (c) passing and compressing said mixture while at said processing temperature between said rolls in the nip thereof while they are rotated at differing angular velocities to compress and subject said mixture to high shear forces acting to effect further mixing of said pigment particles with and produce substantially uniform dispersion thereof in the said melted wax while simultaneously expelling residual moisture from said pigment particles;
   (d) cooling said mixture to a temperature which renders said mixture a brittle, easily breakable solid mass by passing said mixture over and in contact with a surface having a temperature below said selected lower temperature; and,
   (e) then, scraping said solid mass off said surface to break it into flakes.

2. The method as defined in claim 1 wherein said wax is selected from the class consisting of: glyceryl-tris-12-hydroxystearate, methylhydroxystearate, propylene glycol mono-hydroxystearate, glyceryl mono-hydroxystearate, ethylene glycol mono-hydroxystearate and stearyl-12-hydroxystearate.

3. A composition formed from pigment particles which are encapsulated in a hydroxystearate wax, said particles being prepared by the process of claim 1.

4. A method of preparing colorant flakes comprised of hydrophilic color pigment particles embedded in a wax matrix for dry compounding with a polymeric material, said method comprising the steps of:
   (a) providing particles of said hydrophilic color pigment containing absorbed moisture and having a size ranging from about 0.1 micron to about 100 microns;
   (b) providing particles of a wax having a melting point temperature substantially below 212° F. and being mechanically fracturable at approximately room temperature;
   (c) before dehydrating said moisture containing pigment particles, mixing said pigment particles and wax particles and simultaneously heating the formed admixture in the nip region of a pair of rotating heated rolls at a temperature in the range of 250° F. to 450° F. and rotating at different angular velocities to simultaneously boil away any entrapped moisture in said pigment particles while at the same time melt the said particles of wax to encapsulate the said pigment particles and form said particle admixture into a molten wax-pigment particle mixture;
   (d) subjecting the said heated mixture to high shear mixing and simultaneous heating by passing and compressing said mixture between the said heated rolls in the nip thereof to reduce the moisture content of said mixture below about 4% by weight and form it into a layer adhering to the faster rotating one of said heated rolls;
   (e) subjecting the said heated layer mixture on said one roll to additional high shear mixing action and cooling said mixture to a solidified mass at about room temperature by passing and compressing said layer mixture between the said one heated roll and a cooling roll at a temperature lower than the said fracturable temperature of said wax and rotating at an angular velocity faster than said one heated roll; and, (f) mechanically fracturing said solidifed mass into flakes by scraping it off said cooling roll.

5. The method as defined in claim 4 wherein said wax is a hydroxystearate.

6. The method as defined in claim 4 wherein said wax is selected from the class consisting of: glyceryl-tris-12-hydroxystearate, methylhydroxystearate, propylene glycol mono-hydroxystearate, glyceryl mono-hydroxystearate, ethylene glycol mono-hydroxystearate and stearyl-12-hydroxystearate.

7. A composition formed from pigment particles which are encapsulated in a hydroxystearate wax, said particles being prepared by the process of claim 4.

* * * * *